US012186873B2

(12) United States Patent
Fougeroux

(10) Patent No.: US 12,186,873 B2
(45) Date of Patent: Jan. 7, 2025

(54) PERCUSSION APPARATUS EQUIPPED WITH A PRESSURE REGULATING DEVICE

(71) Applicant: MONTABERT, Saint-Priest (FR)

(72) Inventor: Eric Fougeroux, Meyzieu (FR)

(73) Assignee: MONTABERT, Saint-Priest (FR)

( * ) Notice: Subject to any disclaimer, the term of this patent is extended or adjusted under 35 U.S.C. 154(b) by 0 days.

(21) Appl. No.: 18/136,639

(22) Filed: Apr. 19, 2023

(65) Prior Publication Data

US 2023/0339087 A1 Oct. 26, 2023

(30) Foreign Application Priority Data

Apr. 20, 2022 (FR) ..................................... 22/03645

(51) Int. Cl.
*B25D 9/26* (2006.01)
*B25D 9/12* (2006.01)

(52) U.S. Cl.
CPC ................ *B25D 9/26* (2013.01); *B25D 9/12* (2013.01); *B25D 2209/002* (2013.01); *B25D 2250/125* (2013.01); *B25D 2250/371* (2013.01)

(58) Field of Classification Search
CPC . B29D 9/12; B29D 9/26; B29D 9/145; B25D 2250/125; B25D 2250/365; B25D 2250/201; B25D 2250/371; B25D 2209/002
See application file for complete search history.

(56) References Cited

U.S. PATENT DOCUMENTS 4,143,585 A * 3/1979 Selsam .................... B25D 9/20 91/289
4,899,836 A * 2/1990 Vernot ..................... B25D 9/26 173/207
5,890,548 A * 4/1999 Juvonen ................... B25D 9/26 173/208
5,979,291 A * 11/1999 Juvonen ................... B25D 9/18 91/274
2010/0084152 A1* 4/2010 Piras ........................ B25D 9/12 173/206
2014/0326473 A1* 11/2014 Comarmond ............ B25D 9/26 173/1
2017/0312901 A1* 11/2017 Comarmond ............ B25D 9/20

FOREIGN PATENT DOCUMENTS

FR 2584968 A1 1/1987

* cited by examiner

*Primary Examiner* — Thomas M Wittenschlaeger
(74) *Attorney, Agent, or Firm* — CANTOR COLBURN LLP

(57) ABSTRACT

A percussion apparatus including a pressure regulating device comprising a regulating cylinder; a connecting channel opening into the regulating cylinder; a pressure regulating slide mounted movable in translation within the regulating cylinder and delimiting, with the regulating cylinder, a connecting passage having a passage section which varies according to the regulating position occupied by the pressure regulating slide; a biasing element configured to exert a prestress on the pressure regulating slide; and a prestress setting device configured to set a prestress exerted by the biasing element on the pressure regulating slide.

20 Claims, 5 Drawing Sheets

PERCUSSION APPARATUS EQUIPPED WITH A PRESSURE REGULATING DEVICE

CROSS REFERENCE TO RELATED APPLICATIONS

This application claims priority under 35 U.S.C. § 119 to the following French Patent Application No. FR 22/03645, filed on Apr. 20, 2022, the entire contents of which are incorporated herein by reference thereto.

TECHNICAL FIELD

The present disclosure relates to a percussion apparatus, and more particularly to a percussion hydraulic apparatus, provided with a pressure regulating device.

BACKGROUND

A percussion apparatus includes in a known manner:

a body delimiting a piston cylinder, a striking piston mounted displaceable in a reciprocating manner inside the piston cylinder, and configured to hit a tool during each operating cycle of the percussion apparatus, a first control chamber delimited by the striking piston and the piston cylinder, the first control chamber being permanently connected to a high-pressure fluid supply circuit, a second control chamber which is delimited by the striking piston and the piston cylinder, and which is antagonist to the first control chamber, a control distributor configured to control a reciprocating movement of the striking piston inside the piston cylinder in a reciprocating manner along a striking stroke and a return stroke, the control distributor being configured to connect the second control chamber in a reciprocating manner to the high-pressure fluid supply circuit and to a low-pressure return circuit, and a pressure regulating device configured to regulate an operating pressure, also called inlet pressure or supply pressure, of the percussion apparatus to a predetermined value.

Such a pressure regulating device makes it possible to ensure, at each operating cycle of the percussion apparatus, an impact of the striking piston on the tool with a predetermined impact speed, that is to say a predetermined impact energy.

Such a pressure regulating device may for example comprise:

a regulating cylinder delimited by the body, a connecting channel connected to the control distributor and opening into the regulating cylinder, the control distributor being configured to connect the connecting channel to the second control chamber during the return stroke of the striking piston, a pressure regulating slide mounted movable in translation within the regulating cylinder in a direction of translation and configured to occupy a plurality of regulating positions shifted from one another in the direction of translation, the pressure regulating slide and the regulating cylinder being configured to delimit a connecting passage having a passage section which varies according to the regulating position occupied by the pressure regulating slide, the connecting passage being configured to fluidly connect the connecting channel to the low-pressure return circuit, and a biasing element configured to exert a prestress on the pressure regulating slide and to bias the pressure regulating slide to a regulating position of said plurality of regulating positions in which the passage section of the connecting passage is minimal.

In order to be able to adjust the performance of the percussion apparatus, it is known to set the prestress exerted by the biasing element on the pressure regulating slide using shim washers introduced into the regulating cylinder. The addition or removal of such shim washers makes it possible to modify the predetermined value at which the operating pressure is regulated, and therefore to modify the impact speed of the striking piston.

However, the addition or removal of shim washer(s) in order to carry out the aforementioned prestress setting requires the removal of a blanking plug to access the regulating cylinder and therefore the opening of a hydraulic circuit leaving escaping a large quantity of hydraulic oil, which, depending on the environment in which this operation is carried out, may cause pollution if this hydraulic oil is not contained.

The present disclosure aims to remedy this drawback.

BRIEF SUMMARY

The technical problem at the basis of the present disclosure therefore consists in providing a percussion apparatus equipped with a pressure regulating device provided with a biasing element whose prestress may be easily set by a user without risk of pollution of the environment of the percussion apparatus.

To this end, the present disclosure concerns a percussion apparatus, including:

a body delimiting a piston cylinder, a striking piston mounted displaceable in a reciprocating manner inside the piston cylinder, and configured to hit a tool during each operating cycle of the percussion apparatus, a first control chamber delimited by the striking piston and the piston cylinder, the first control chamber being permanently connected to a high-pressure fluid supply circuit, a second control chamber which is delimited by the striking piston and the piston cylinder, and which is antagonist to the first control chamber, a control distributor configured to control a reciprocating movement of the striking piston inside the piston cylinder in a reciprocating manner along a striking stroke and a return stroke, the control distributor being configured to connect the second control chamber in a reciprocating manner to the high-pressure fluid supply circuit and to a low-pressure return circuit, and a pressure regulating device configured to regulate an operating pressure of the percussion apparatus to a predetermined value, the pressure regulating device including:

a regulating cylinder, for example delimited by the body or provided in a support fastened to the body, a connecting channel opening into the regulating cylinder and configured to be connected to the second control chamber during the return stroke of the striking piston, a pressure regulating slide mounted movable in translation within the regulating cylinder in a direction of translation and configured to occupy a plurality of regulating positions shifted from one another in the direction of translation, the pressure regulating slide and the regulating cylinder being configured to delimit a connecting passage having a passage section which varies according to the regulating position occupied by the pressure regulating slide, the connecting passage being configured to fluidly connect the connecting channel to the low-pressure return circuit, a biasing element configured to exert a prestress on the pressure regulating slide and to bias the pressure regulating slide to a regulating position, of said plurality of regulating positions, in which the passage section of the connecting passage is minimal, characterized in that the pressure regulating device includes a prestress setting device configured to set a prestress exerted by the biasing element on the pressure regulating slide, the prestress setting device including:

a blanking plug configured to blank off, for example in a removable manner, an open end of the regulating cylinder, an actuating member disposed in the regulating cylinder and configured to cooperate with the biasing element, the actuating member being displaceable in a direction of displacement substantially parallel to the direction of translation, and a setting member mounted movable in rotation relative to the actuating member about an axis of rotation, the setting member including a setting part, which may for example be globally cylindrical, configured to be accessible from the outside of the percussion apparatus and to be driven in rotation by a user, and a drive part disposed in the regulating cylinder and mechanically connected to the actuating member, the blanking plug including an opening passage configured to make the setting part accessible from the outside of the percussion apparatus, the setting member and the actuating member being configured such that a rotation of the setting member about the axis of rotation and in a first direction of rotation causes a displacement of the actuating member towards the pressure regulating slide so as to increase the prestress applied by the biasing element on the pressure regulating slide and such that a rotation of the setting member about the axis of rotation and in a second direction of rotation, opposite to the first direction of rotation, causes a displacement of the actuating member away from the pressure regulating slide so as to reduce the prestress applied by the biasing element on the pressure regulating slide, and in that the pressure regulating device includes an indexing mechanism configured to define, for the setting member, a plurality of angular indexing positions in each of which the setting member occupies, relative to the actuating member, a respective angular position which is stable.

Such a configuration of the pressure regulating device of the percussion apparatus according to the present disclosure allows a user to easily set the prestress exerted by the biasing element by rotating the setting member from the outside of the percussion apparatus, that is to say without opening a hydraulic circuit and therefore without risk of pollution of the environment of the percussion apparatus.

The percussion apparatus may also have one or more of the following characteristics, taken alone or in combination.

According to one embodiment of the present disclosure, the connecting channel is connected to the control distributor, and the control distributor is configured to connect the connecting channel to the second control chamber during the return stroke of the striking piston.

According to one embodiment of the present disclosure, the biasing element includes a first end portion configured to cooperate with, and for example to bear against, the actuating member, and a second end portion configured to cooperate with, and for example to bear against, the pressure regulating slide.

According to one embodiment of the present disclosure, the actuating member is slidably mounted in the direction of displacement.

According to one embodiment of the present disclosure, the actuating member includes a seat, preferably annular, against which the first end portion of the biasing element bears.

According to one embodiment of the present disclosure, the biasing element is a compression spring, the first end portion of which bears against the actuating member and the second end portion of which bears against the pressure regulating slide.

According to one embodiment of the present disclosure, the setting member includes an annular abutment surface against which the actuating member is configured to come into abutment, the annular abutment surface being configured to limit the displacement stroke of the actuating member as opposed to the pressure regulating slide.

According to one embodiment of the present disclosure, the number of angular indexing positions is between two and eight, advantageously between four and eight, and is for example equal to six.

According to one embodiment of the present disclosure, the passage opening includes a first end opening into the regulating cylinder and a second end opening out of the percussion apparatus.

According to one embodiment of the present disclosure, the setting part extends at least partly into the passage opening.

According to one embodiment of the present disclosure, the blanking plug includes a blanking part provided with an external surface into which the second end of the passage opening opens. Advantageously, the setting part is flush with or is set back from the external surface of the blanking part. However, according to one variant embodiment of the present disclosure, the setting part could protrude from said external surface.

According to one embodiment of the present disclosure, the passage opening extends coaxially with the axis of rotation.

According to one embodiment of the present disclosure, the blanking plug is fastened to the body, for example by screwing, and is configured to be immobile relative to the body.

According to one embodiment of the present disclosure, the indexing mechanism includes several indexing recesses provided on one of the blanking plug and the setting member and distributed about the axis of rotation, and at least one indexing projection provided on the other of the blanking plug and the setting member and configured to cooperate with one of the indexing recesses when the setting member occupies a respective angular indexing position.

According to one embodiment of the present disclosure, the indexing mechanism includes several indexing projections distributed about the axis of rotation.

According to one embodiment of the present disclosure, the at least one indexing projection is formed by an indexing ball mounted within a receiving cavity which is provided on the blanking plug or the setting member and which is internally delimited by a spherical surface portion.

According to one embodiment of the present disclosure, the setting member is displaceable in translation relative to the blanking plug in a direction substantially parallel to the direction of displacement, the biasing element being configured to maintain the setting member in contact with the blanking plug. Thus, the force exerted by the biasing element on the setting member and the cam effect between the blanking plug and the setting member prevents any misadjustment due to the vibrations generated by the percussion apparatus.

According to one embodiment of the present disclosure, the blanking plug forms a cam and the setting member forms a cam follower.

According to one embodiment of the present disclosure, the setting member includes a bearing part, such as a bearing flange, which is located axially between the setting part and the drive part, and which is configured to bear against the blanking plug.

According to one embodiment of the present disclosure, the blanking plug includes an internal guide surface which is generally cylindrical, and which is configured to guide the setting member in rotation and in translation.

According to one embodiment of the present disclosure, the bearing part includes the annular abutment surface.

According to one embodiment of the present disclosure, the blanking plug includes a fastening part which is tubular, and which is fastened in the regulating cylinder, the actuating member being mounted displaceable, and for example slidably mounted, within the fastening part.

According to one embodiment of the present disclosure, the actuating member includes first splines extending in the direction of displacement, and the blanking plug includes second splines extending in the direction of displacement and configured to cooperate with the first splines provided on the actuating member, the first and second splines being configured to guide the actuating member in translation in the direction of displacement.

According to one embodiment of the present disclosure, the second splines are provided on an internal surface of the fastening part.

According to one embodiment of the present disclosure, the blanking plug includes a plug body and an internal, for example annular, insert which is disposed in the plug body and which is fixed relative to the plug body, the internal insert being interposed between the plug body and the setting member, and the indexing recesses or the at least one indexing projection being provided on the internal insert.

According to one embodiment of the present disclosure, the internal insert is interposed between the plug body and the bearing part.

According to one embodiment of the present disclosure, the drive part includes a threaded drive rod extending substantially parallel to the direction of displacement, and the actuating member includes a tapped axial bore configured to cooperate with the threaded drive rod.

According to one embodiment of the present disclosure, the pressure regulating slide, the setting member and the actuating member are disposed substantially coaxially.

According to one embodiment of the present disclosure, the pressure regulating slide includes an annular groove which is permanently fluidly connected to the connecting channel, the annular groove including an annular edge configured to define the connecting passage at least partially.

According to one embodiment of the present disclosure, the pressure regulating device includes a first regulating chamber which is delimited by the pressure regulating slide and the regulating cylinder and which is permanently fluidly connected to the high-pressure fluid supply circuit, and a second regulating chamber which is delimited by the pressure regulating slide and the regulating cylinder and which is permanently fluidly connected to the low-pressure return circuit, the connecting passage being configured to fluidly connect the connecting channel to the second regulating chamber.

According to one embodiment of the present disclosure, the biasing element and the actuating member are disposed in the second regulating chamber.

According to one embodiment of the present disclosure, the second regulating chamber is antagonist to the first regulating chamber.

According to one embodiment of the present disclosure, a first face of the pressure regulating slide is located in the first regulating chamber and a second face of the pressure regulating slide, opposite to the first face, is located in the second regulating chamber.

According to one embodiment of the present disclosure, the prestress setting device includes setting marks provided on a fixed reading area, for example provided on the body or the blanking plug, each setting mark corresponding to a respective angular indexing position (and therefore to a respective value of the prestress applied by the biasing element on the pressure regulating slide), and a reading mark associated with the setting marks and provided on the setting part.

According to one embodiment of the present disclosure, the pressure regulating device includes an abutment, for example annular, element fastened to the setting member, for example to the drive part, and configured to limit the displacement stroke of the actuating member towards the pressure regulating slide.

According to one embodiment of the present disclosure, the blanking plug includes an annular internal groove extending around the setting part, and a seal disposed in the annular internal groove and configured to cooperate with the setting part. The seal may for example be provided with an annular sealing lip configured to cooperate with the setting part.

According to one embodiment of the present disclosure, the blanking plug and the actuating member define an annular housing in which the first end portion of the biasing element is received.

According to one embodiment of the present disclosure, the blanking plug includes an annular external groove provided on the fastening part and extending around the fastening part, and an annular seal disposed in the annular external groove and configured to cooperate with the body of the percussion apparatus. The annular seal may for example be an O-ring.

BRIEF DESCRIPTION OF THE FIGURES

Anyway, the present disclosure will be well understood, using the following description with reference to the appended schematic drawings representing, as non-limiting examples, several embodiments of this percussion apparatus.

DETAILED DISCLOSURE

Figure 1:
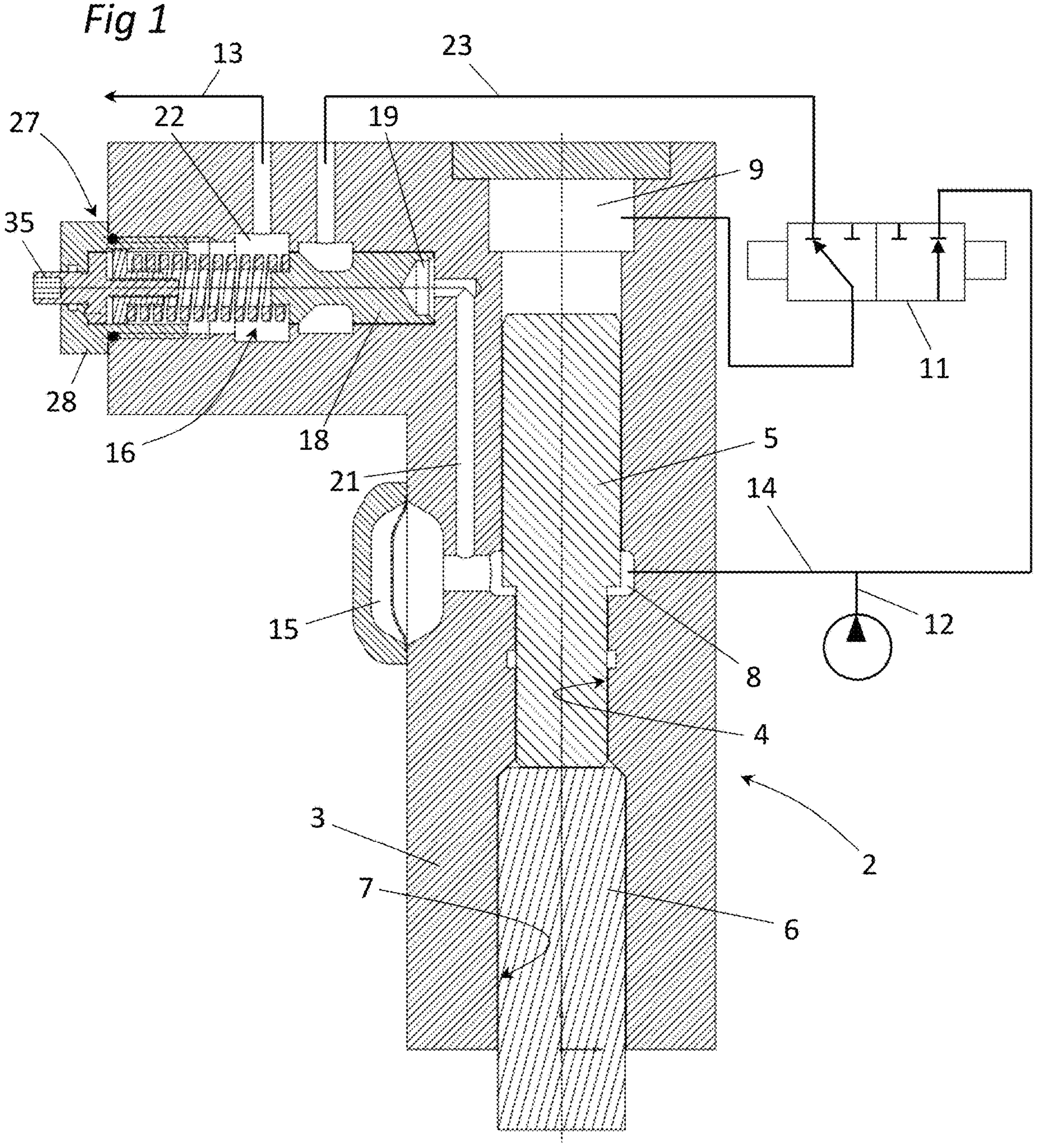
FIG. 1 is a schematic longitudinal sectional view of a percussion hydraulic apparatus according to a first embodiment of the present disclosure.
Figure 2:
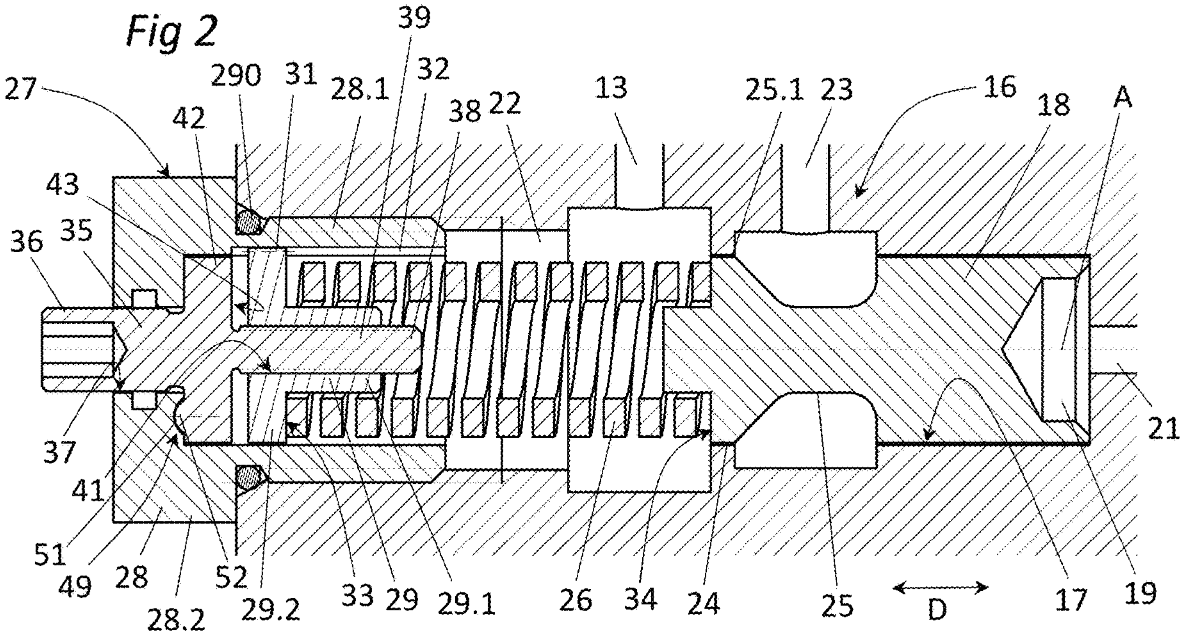
FIG. 2 is a partial longitudinal sectional view, and on an enlarged scale, of a pressure regulating device belonging to the percussion hydraulic apparatus of FIG. 1, the pressure regulating slide of which occupies a first regulating position.
Figure 3:
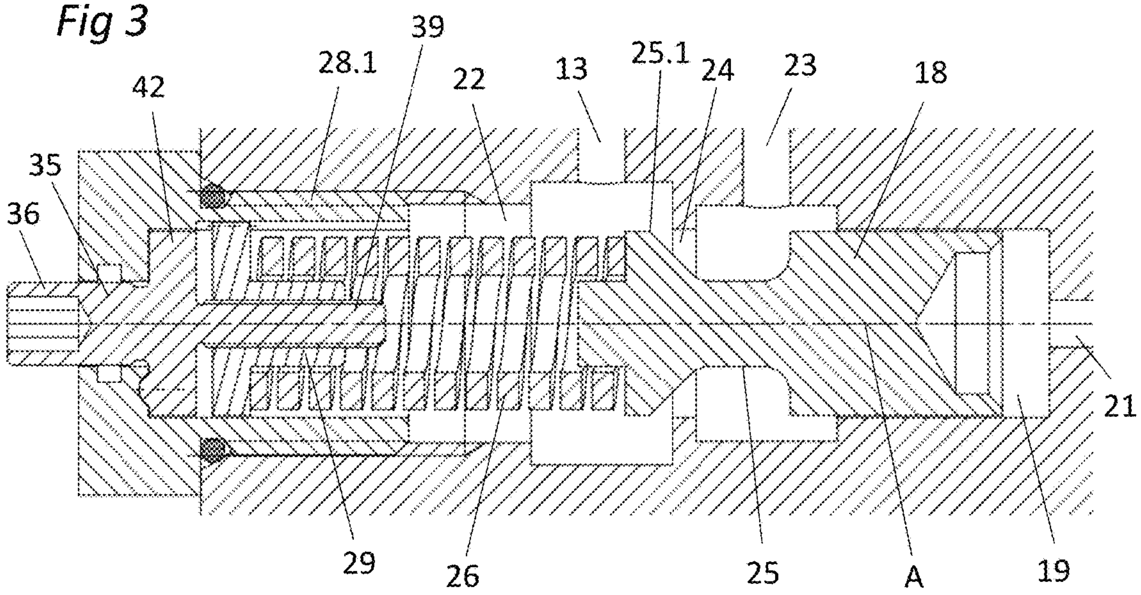
FIG. 3 is a partial longitudinal sectional view, and on an enlarged scale, of the pressure regulating device of FIG. 2, the pressure regulating slide of which occupies a second regulating position.

FIGS. 1 to 3 represent a percussion apparatus 2 according to a first embodiment of the present disclosure.

The percussion apparatus 2 includes a body 3 delimiting a piston cylinder 4, and a striking piston 5 which is stepped, and which is slidably mounted in a reciprocating manner inside the piston cylinder 4. During each operating cycle of the percussion apparatus 2, the striking piston 5 is configured to hit the upper end of a tool 6 slidably mounted inside a bore 7 provided in the body 3 coaxially with the piston cylinder 4.

The striking piston 5 and the piston cylinder 4 delimit a first control chamber 8 which is annular, and a second control chamber 9 which is antagonist to the first control chamber 8 and which has a larger cross section than that of the first control chamber 8. The second control chamber 9 may for example be disposed above the striking piston 5.

The percussion apparatus 2 further includes a control distributor 11 arranged to control a reciprocating movement of the striking piston 5 inside the piston cylinder 4 in a reciprocating manner along a striking stroke and a return stroke. The control distributor 11 is configured to fluidly connect the second control chamber 9 in a reciprocating manner with a high-pressure fluid supply circuit 12 during the striking stroke of the striking piston 5, and with a low-pressure return circuit 13 during the return stroke of the striking piston 5.

The first control chamber 8 is permanently connected to the high-pressure fluid supply circuit 12 by a supply channel 14, so that each position of the control distributor 11 causes the striking stroke of the striking piston 5, then the return stroke of the striking piston 5. The supply channel 14 may advantageously be connected to a hydraulic accumulator 15.

The percussion apparatus 2 further includes a pressure regulating device 16 configured to regulate an operating pressure of the percussion apparatus 2 to a predetermined value.

As shown more particularly in FIG. 2, the pressure regulating device 16 includes a regulating cylinder 17 delimited by the body 3, and a pressure regulating slide 18 mounted movable in translation within the regulating cylinder 17 in a direction of translation D. The pressure regulating slide 18 is configured to occupy a plurality of regulating positions shifted from one another in the direction of translation D.

The pressure regulating slide 18 and the regulating cylinder 17 delimit a first regulating chamber 19 which is permanently fluidly connected to the high-pressure fluid supply circuit 12 through a channel 21 fluidly connected to the first control chamber 8, and a second regulating chamber 22 which is antagonist to the first regulating chamber 19 and which is permanently fluidly connected to the low-pressure return circuit 13. Advantageously, a first face of the pressure regulating slide 18 is located in the first regulating chamber 19 and a second face of the pressure regulating slide 18, opposite to the first face, is located in the second regulating chamber 22.

The pressure regulating device 16 also includes a connecting channel 23 including a first end which is fluidly connected to the control distributor 11, and a second end which opens into the regulating cylinder 17. The control distributor 11 is more particularly configured to connect the connecting channel 23 to the second control chamber 9 during the return stroke of the striking piston 5.

The pressure regulating slide 18 and the regulating cylinder 17 are also configured to delimit a connecting passage 24 having a passage section which varies according to the regulating position occupied by the pressure regulating slide 18. The connecting passage 24 is configured to fluidly connect the connecting channel 23 to the second regulating chamber 22, and therefore to the low-pressure return circuit 13. Advantageously, the pressure regulating slide 18 includes, on its external surface, an annular groove 25 permanently fluidly connected to the connecting channel 23 and provided with an annular edge 25.1 configured to define the connecting passage 24 at least partially.

The pressure regulating device 16 further includes a biasing element 26, such as a compression spring, disposed in the second regulating chamber 22 and configured to exert a prestress on the pressure regulating slide 18 and to bias the pressure regulating slide 18 to a regulating position in which the passage section of the connecting passage 24 is minimal and for example zero or substantially zero. Thus, when the percussion apparatus 2 is not supplied with high-pressure fluid, the biasing element 26 exerts a force on the pressure regulating slide 18 intended to close the connecting passage 24. When the percussion apparatus 2 is supplied with high-pressure fluid, the first regulating chamber 19 is supplied with high-pressure fluid through the channel 21 and exerts, on the pressure regulating slide 18, a force opposite to that exerted by the biasing element 26. As soon as this force exceeds that of the prestress exerted by the biasing element 26, the pressure regulating slide 18 translates towards the biasing element 26, which increases the passage section of the connecting passage 24.

The pressure regulating device 16 further includes a prestress setting device 27 configured to set the prestress exerted by the biasing element 26 on the pressure regulating slide 18.

As shown more particularly in FIG. 2, the prestress setting device 27 includes a blanking plug 28 configured to blank off an open end of the regulating cylinder 17. The blanking plug 28 is fastened to the body 3 and is configured to be immobile relative to the body 3. According to the embodiment represented in FIGS. 1 to 3, the blanking plug 28 includes a fastening part 28.1 which is tubular, and which is fastened, for example by screwing, in the regulating cylinder 17, and a blanking part 28.2 which is configured to blank off the open end of the regulating cylinder 17.

The blanking plug 28 may for example include an annular external groove provided on the fastening part 28.1 and extending around the fastening part 28.1, and an annular seal 290 disposed in the annular external groove and configured to cooperate with the body 3 of the percussion apparatus 2. The annular seal 290 may for example be an O-ring.

The prestress setting device 27 further includes an actuating member 29 configured to cooperate with the biasing element 26. The actuating member 29 is disposed in the second regulating chamber 22 and is displaceable in a direction of displacement parallel to the direction of translation D. Advantageously, the actuating member 29 forms a pusher configured to exert a pushing force on the biasing element 26.

Advantageously, the actuating member 29 is connected to the blanking plug 28 by a guideway connection. In particular, the actuating member 29 is slidably mounted within the fastening part 28.1 of the blanking plug 28 and in the direction of displacement. To this end, the actuating member 29 includes, on its external surface, first splines 31 extending in the direction of displacement, and the fastening part 28.1 includes, on its internal surface, second splines 32 extending in the direction of displacement and configured to cooperate with the first splines 31 provided on the actuating member 29. The first and second splines 31, 32 are configured to guide the actuating member 29 in translation in the direction of displacement.

As shown in FIG. 2, the biasing element 26 includes a first end portion bearing against a first annular seat 33 provided on the actuating member 29, and a second end portion bearing against a second annular seat 34 provided on the pressure regulating slide 18. The biasing element 26 more particularly exerts an axial force on the actuating member 29 and an opposite axial force on the pressure regulating slide 18.

Advantageously, the blanking plug 28 and the actuating member 29 define an annular housing in which the first end portion of the biasing element 26 is received.

According to the embodiment represented in FIGS. 1 to 3, the actuating member 29 includes a support part 29.1 which is annular and configured to support the first end portion of the biasing element 26, and an actuating part 29.2 which is annular, and which extends radially from one end of the support part 29.1 which is located on the side of the blanking plug 28. Advantageously, the actuating part 29.2 includes the first annular seat 33 and is configured to compress the biasing element 26 when the actuating member 29 is moved towards the pressure regulating slide 18. The prestress setting device 27 also includes a setting member 35 connected to the blanking plug 28 by a sliding pivot connection. Thus, the setting member 35 is mounted movable in rotation relative to the actuating member 29 about an axis of rotation A, and is also displaceable in translation relative to the blanking plug 28 in a direction substantially parallel to the direction of displacement. Advantageously, the pressure regulating slide 18, the setting member 35 and the actuating member 29 are disposed coaxially.

The setting member 35 includes a setting part 36, which may for example be globally cylindrical, configured to be accessible from the outside of the percussion apparatus 2 and to be driven in rotation by a user. To this end, the blanking part 28.2 includes a passage opening 37 configured to make the setting part 36 accessible from the outside of the percussion apparatus 2. Advantageously, the passage opening 37 extends coaxially with the axis of rotation A and includes a first end opening into the regulating cylinder 17 and a second end opening into an external surface of the blanking part 28.2. According to the embodiment represented in FIGS. 1 to 3, the setting part 36 extends at least partly in the passage opening 37, and may for example be flush with or be set back from the external surface of the blanking part 28.2. However, according to one variant embodiment of the present disclosure, the setting part 36 could protrude from said external surface.

The setting member 35 further includes a drive part 38 disposed in the second regulating chamber 22, and mechanically connected to the actuating member 29. The drive part 38 is advantageously connected to the actuating member 29 by a helical connection. According to the embodiment represented in FIGS. 1 to 3, the drive part 38 includes a threaded drive rod 39 extending coaxially with the axis of rotation A, and the actuating member 29 includes a tapped axial bore 41, which may for example extend over the entire length of the actuating member 29, configured to cooperate with the threaded drive rod 39. Advantageously, the biasing element 26 is configured to maintain the setting member 35 in contact with the blanking plug 28 via the helical connection between the actuating member 29 and the setting member 35.

The setting member 35 and the actuating member 29 are more particularly configured such that a rotation of the setting member 35 about the axis of rotation A and in a first direction of rotation causes a displacement of the actuating member 29 towards the pressure regulating slide 18 (and therefore a compression of the biasing element 26) so as to increase the prestress applied by the biasing element 26 on the pressure regulating slide 18, and in such a way that a rotation of the setting member 35 about the axis of rotation A and in a second direction of rotation, opposite to the first direction of rotation, causes a displacement of the setting member 29 away from the pressure regulating slide 18 (and therefore a relaxation of the biasing element 26) so as to reduce the prestress applied by the biasing element 26 on the pressure regulating slide 18.

According to the embodiment represented in FIGS. 1 to 3, the setting member 35 includes a bearing part 42, such as a bearing flange, which is located axially between the setting part 36 and the drive part 38 and which is configured to bear against the blanking plug 28. Advantageously, the bearing part 42 includes an annular abutment surface 43 against which the actuating member 29 is configured to come into abutment. The annular abutment surface 43 is more particularly configured to limit the displacement stroke of the actuating member 29 as opposed to the pressure regulating slide 18, that is to say towards the blanking plug 28.

Figure 4:
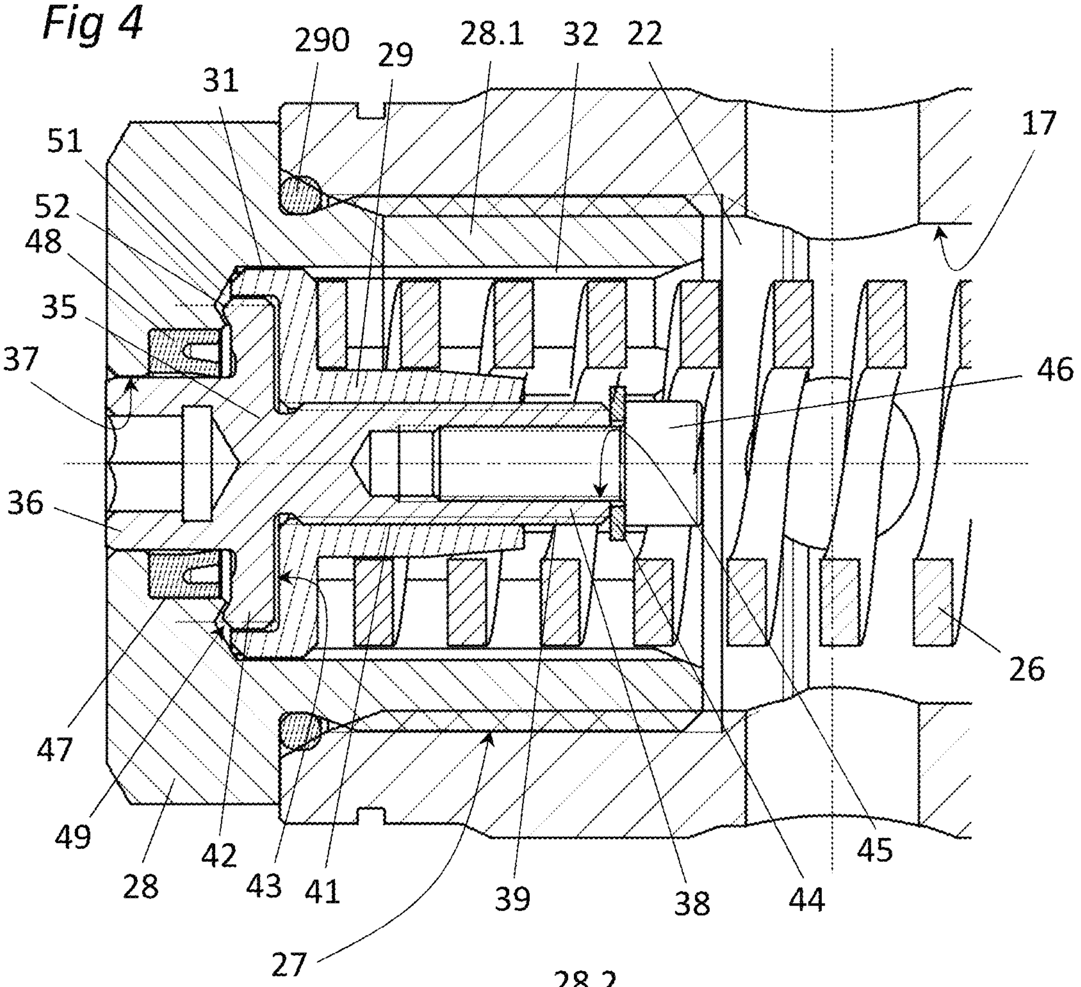
FIG. 4 is a partial longitudinal sectional view, and on an enlarged scale, of a pressure regulating device belonging to a percussion hydraulic apparatus according to a second embodiment of the present disclosure.
Figure 5:
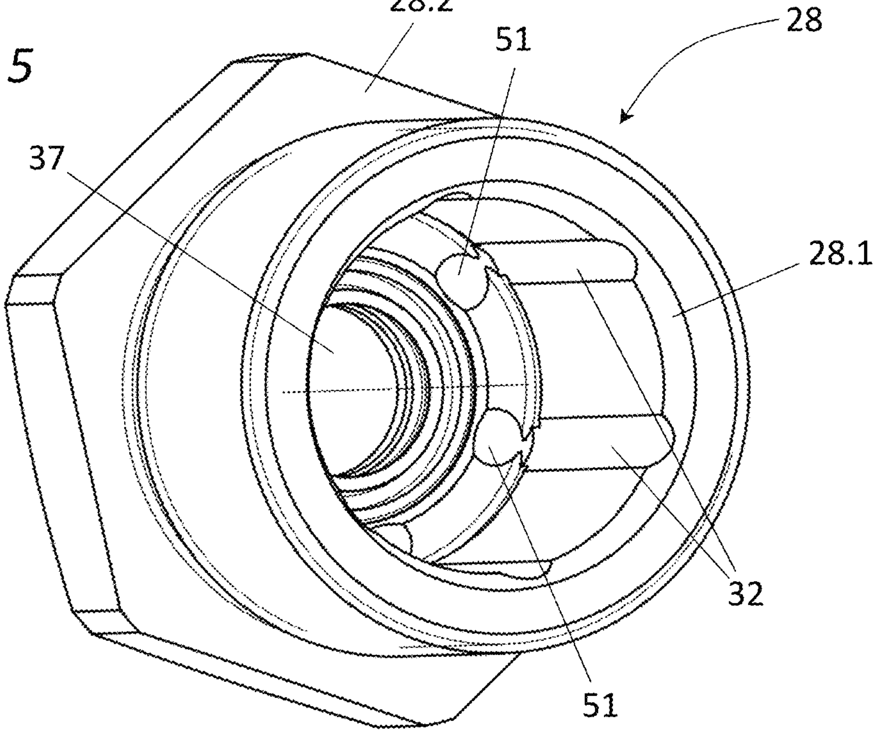
FIG. 5 is a perspective view of a blanking plug belonging to the pressure regulating device of FIG. 4.
Figure 6:
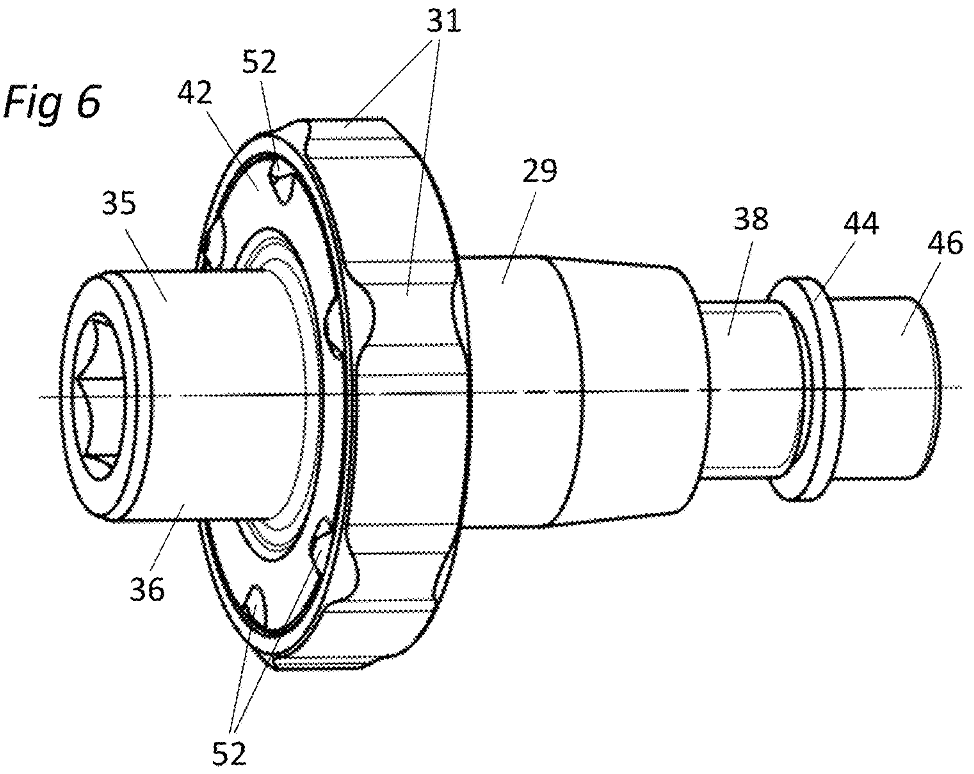
FIG. 6 is a perspective view of an actuating member and a setting member belonging to the pressure regulating device of FIG. 4.

The pressure regulating device 16 may also include (according to a second embodiment of the present disclosure represented in FIGS. 4 to 6) an abutment, for example annular, element 44 fastened to the setting member 35, for example to the drive part 38, and configured to limit the displacement stroke of the actuating member 29 towards the pressure regulating slide 18. According to the embodiment represented in FIGS. 1 to 3, the drive part 38 includes a tapped fastening bore 45 opening at one end of the drive part 38 which faces the pressure regulating slide 18, the abutment element 44 being fastened to the setting member 35 by a press screw 46 cooperating with the tapped fastening bore 45.

According to the embodiment represented in FIGS. 1 to 3, the blanking plug 28 includes an annular internal groove 47 extending around the setting part 36, and a seal 48 disposed in the annular internal groove 47 and configured to cooperate with the setting part 36. The seal 48 may for example be provided with an annular sealing lip configured to cooperate with the setting part 36.

The pressure regulating device 16 also includes an indexing mechanism 49 configured to define, for the setting member 35, a plurality of angular indexing positions in each of which the setting member 35 occupies, relative to the actuating member 29, a respective angular position which is stable. The number of angular indexing positions may be between two and eight, advantageously between four and eight, and is for example equal to six.

According to the embodiment represented in FIGS. 1 to 3, the indexing mechanism 49 includes several indexing recesses 51 provided on the blanking part 28.2 and distributed about the axis of rotation A, and several indexing projections 52 provided on the bearing part 42 and distributed about the axis of rotation A. Each indexing projection 52 is configured to cooperate with an indexing recess 51 when the setting member 35 occupies each of the angular indexing positions. Thus, the setting member 35 is also connected to the blanking plug 28 by a cam connection, the blanking plug 28 forming a cam and the setting member 35 forming a cam follower. Each indexing projection 52 may be integral with the bearing part 42 or be attached to the latter.

Advantageously, the prestress setting device 27 may also include:

- setting marks (not visible in the figures) provided on a fixed reading area, for example provided on the blanking plug 28, each setting marker corresponding to a respective angular indexing position (and therefore to a respective value of the prestress applied by the biasing element 26 on the pressure regulating slide 18), and
- a reading mark (not visible in the figures) associated with the setting marks and provided on the setting part 36.

To set the prestress exerted by the biasing element 26 on the pressure regulating slide 18, a user rotates the setting member 35 with the aid of a suitable key inserted for example in a hexagon imprint provided on the setting part 36, until positioning the reading mark opposite the setting mark corresponding to the desired prestress value. Such a rotation of the setting member 35 causes a translation of the actuating member 29 relative to the blanking plug 28 (towards the pressure regulating slide 18 or the blanking plug 18 according to the direction of rotation), because the actuating member 29 is connected to the setting member 35 by a helical connection and is connected to the blanking plug 28 by a guideway connection. Such a translation of the actuating member 29 allows the setting of the prestress exerted by the biasing element 26 on the pressure regulating slide 18.

Advantageously, each indexing recess 51 and/or each indexing projection 52 include inclined or rounded surfaces so as to limit the torque required to overcome the resistance induced by the cam connection between the blanking plug 28 and the setting member 35.

Figure 7:
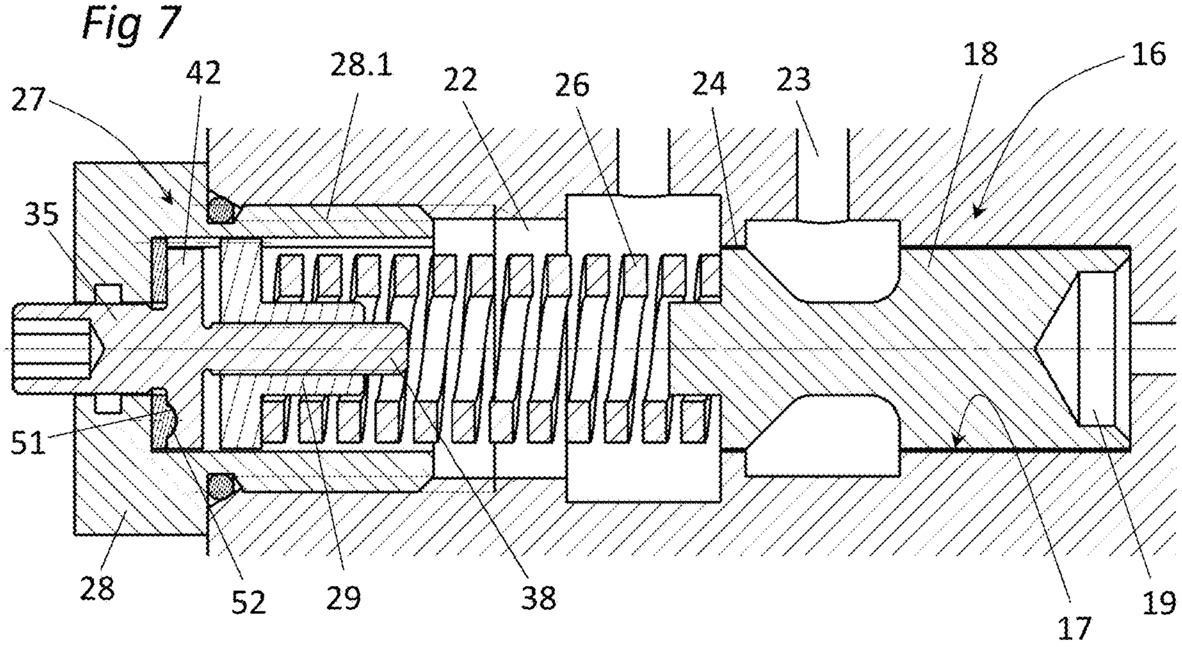
FIG. 7 is a partial longitudinal sectional view, and on an enlarged scale, of a pressure regulating device belonging to a percussion hydraulic apparatus according to a third embodiment of the present disclosure.

FIG. 7 represents a percussion apparatus 2 according to a third embodiment of the present disclosure which differs from the embodiment represented in FIGS. 1 to 3 essentially in that the blanking plug 28 includes a plug body 281 and an internal, for example annular, insert 282 which is fixed relative to the plug body 281 and which is interposed between the plug body 281 and the bearing part 42, and in that the indexing projections 52 are provided on the internal insert 282. Advantageously, the internal insert 282 is locked in rotation relative to the blanking plug 28 by cooperation with the second splines 32.

Figure 8:
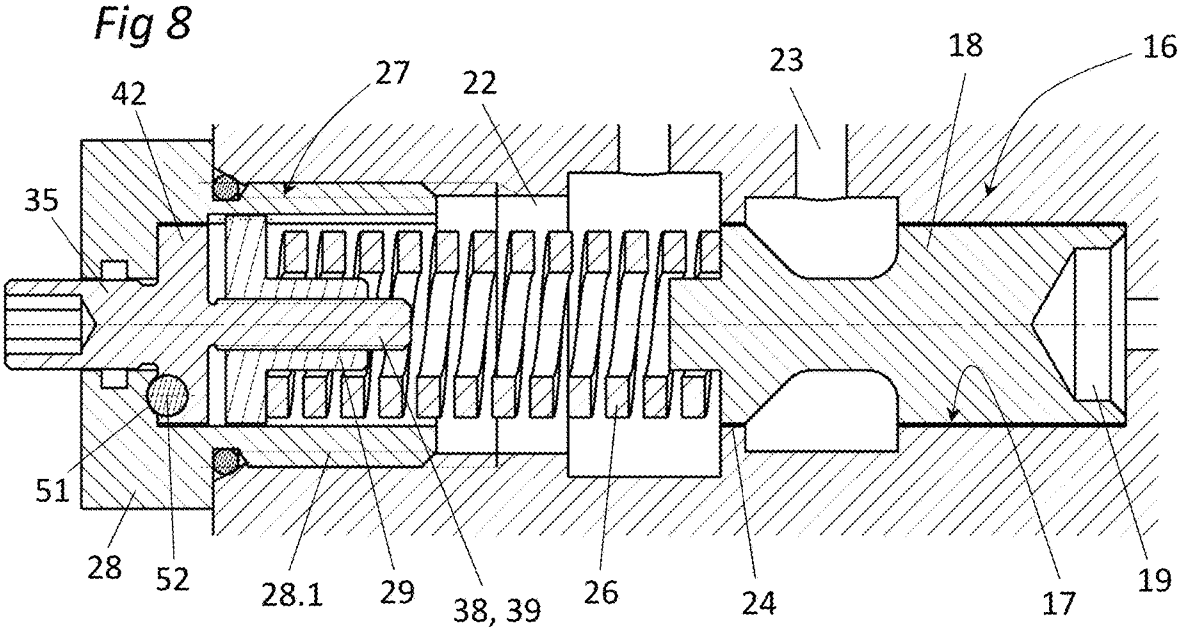
FIG. 8 is a partial longitudinal sectional view, and on an enlarged scale, of a pressure regulating device belonging to a percussion hydraulic apparatus according to a fourth embodiment of the present disclosure.

FIG. 8 represents a percussion apparatus 2 according to a fourth embodiment of the present disclosure which differs from the embodiment represented in FIGS. 1 to 3 essentially in that each indexing projection 52 is formed by an indexing ball mounted in a respective receiving cavity which is provided on the setting member 35 and which is internally delimited by a spherical surface portion. Such a configuration of the indexing mechanism 49 minimizes the friction between the setting member 35 and the blanking plug 28, and therefore the wear of the setting member 35 and the blanking plug 28.

Of course, the present disclosure is in no way limited to the embodiments described and illustrated which have been given only by way of examples. Modifications remain possible, in particular from the point of view of the constitution of the various elements or by substitution of technical equivalents, without departing from the field of protection of the present disclosure.

The invention claimed is:

1. A percussion apparatus including:

- a body delimiting a piston cylinder,
- a striking piston mounted displaceable in a reciprocating manner inside the piston cylinder, and configured to hit a tool during each operating cycle of the percussion apparatus,
- a first control chamber delimited by the striking piston and the piston cylinder, the first control chamber being permanently connected to a high-pressure fluid supply circuit,
- a second control chamber which is delimited by the striking piston and the piston cylinder, and which is antagonist to the first control chamber,
- a control distributor configured to control a reciprocating movement of the striking piston inside the piston cylinder in a reciprocating manner along a striking stroke and a return stroke, the control distributor being configured to connect the second control chamber in a reciprocating manner to the high-pressure fluid supply circuit and to a low-pressure return circuit, and
- a pressure regulating device configured to regulate an operating pressure of the percussion apparatus to a predetermined value, the pressure regulating device comprising:
  - a regulating cylinder,
  - a connecting channel opening into the regulating cylinder and configured to be connected to the second control chamber during the return stroke of the striking piston,
  - a pressure regulating slide mounted movable in translation within the regulating cylinder in a direction of translation and configured to occupy a plurality of regulating positions shifted from one another in the direction of translation, the pressure regulating slide and the regulating cylinder being configured to delimit a connecting passage having a passage section which varies according to the regulating position occupied by the pressure regulating slide, the connecting passage being configured to fluidly connect the connecting channel to the low-pressure return circuit,
  - a biasing element configured to exert a prestress on the pressure regulating slide and to bias the pressure regulating slide to a regulating position in which the passage section of the connecting passage is minimal, wherein the pressure regulating device includes a prestress setting device configured to set a prestress exerted by the biasing element on the pressure regulating slide, the prestress setting device including:

a blanking plug configured to blank off an open end of the regulating cylinder, an actuating member disposed in the regulating cylinder and configured to cooperate with the biasing element, the actuating member being displaceable in a direction of displacement substantially parallel to the direction of translation, and an setting member mounted movable in rotation relative to the actuating member around an axis of rotation, the setting member including a setting part configured to be accessible from the outside of the percussion apparatus and to be driven in rotation by a user, and a drive part disposed in the regulating cylinder and mechanically connected to the actuating member, the blanking plug including a passage opening configured to make the setting part accessible from the outside of the percussion apparatus, the setting member and the actuating member being configured such that a rotation of the setting member about the axis of rotation and in a first direction of rotation causes a displacement of the actuating member towards the pressure regulating slide so as to increase the prestress applied by the biasing element on the pressure regulating slide and such that a rotation of the setting member about the axis of rotation and in a second direction of rotation, opposite to the first direction of rotation, causes a displacement of the actuating member away from the pressure regulating slide so as to reduce the prestress applied by the biasing element on the pressure regulating slide, and in that the pressure regulating device includes an indexing mechanism configured to define, for the setting member, a plurality of angular indexing positions in each of which the setting member occupies, relative to the actuating member, a respective angular position which is stable.

2. The percussion apparatus according to claim 1, wherein the indexing mechanism includes several indexing recesses provided on one of the blanking plug and the setting member and distributed about the axis of rotation, and at least one indexing projection provided on the other of the blanking plug and the setting member and configured to cooperate with one of the indexing recesses when the setting member occupies a respective angular indexing position.

3. The percussion apparatus according to claim 1, wherein the setting member is displaceable in translation relative to the blanking plug in a direction substantially parallel to the direction of displacement, the biasing element being configured to maintain the setting member in contact with the blanking plug.

4. The percussion apparatus according to claim 3, wherein the setting member includes a bearing part which is located axially between the setting part and the drive part and which is configured to bear against the blanking plug.

5. The percussion apparatus according to claim 1, wherein the blanking plug includes a fastening part which is tubular and which is fastened in the regulating cylinder, the actuating member being mounted displaceable within the fastening part.

6. The percussion apparatus according to claim 1, wherein the actuating member includes first splines extending in the direction of displacement, and the blanking plug includes second splines extending in the direction of displacement and configured to cooperate with the first splines provided on the actuating member, the first and second splines being configured to guide the actuating member in translation in the direction of displacement.

7. The percussion apparatus according to claim 1, wherein the drive part includes a threaded drive rod extending substantially parallel to the direction of displacement, and the actuating member includes a tapped axial bore configured to cooperate with the threaded drive rod.

8. The percussion apparatus according to claim 1, wherein the pressure regulating slide, the setting member and the actuating member are disposed substantially coaxially.

9. The percussion apparatus according to claim 1, wherein the pressure regulating slide includes an annular groove which is permanently fluidly connected to the connecting channel, the annular groove including an annular edge configured to at least partially define the connecting passage.

10. The percussion apparatus according to claim 1, wherein the pressure regulating device comprises a first regulating chamber which is delimited by the pressure regulating slide and the regulating cylinder and which is permanently fluidly connected to the high-pressure fluid supply circuit, and a second regulating chamber which is delimited by the pressure regulating slide and the regulating cylinder and which is permanently fluidly connected to the low-pressure return circuit, the connecting passage being configured to fluidly connect the connecting channel to the second regulating chamber.

11. The percussion apparatus according to claim 1, wherein the pressure regulating device includes an abutment element fastened to the setting member and configured to limit a displacement stroke of the actuating member towards the pressure regulating slide.

12. The percussion apparatus according to claim 1, wherein the connecting channel is connected to the control distributor, and the control distributor is configured to connect the connecting channel to the second control chamber during the return stroke of the striking piston.

13. The percussion apparatus according to claim 1, wherein the blanking plug includes an annular internal groove extending around the setting part, and a seal disposed in the annular internal groove and configured to cooperate with the setting part.

14. The percussion apparatus according to claim 13, wherein the seal is provided with an annular sealing lip configured to cooperate with the setting part.

15. The percussion apparatus according to claim 1, wherein the setting member is displaceable in translation relative to the blanking plug in a direction substantially parallel to the direction of displacement, the biasing element being configured to maintain the setting member in contact with the blanking plug.

16. The percussion apparatus according to claim 15, wherein the setting member includes a bearing part which is located axially between the setting part and the drive part and which is configured to bear against the blanking plug.

17. The percussion apparatus according to claim 16, wherein the blanking plug includes a fastening part which is tubular and which is fastened in the regulating cylinder, the actuating member being mounted displaceable within the fastening part.

18. The percussion apparatus according to claim 17, wherein the actuating member includes first splines extending in the direction of displacement, and the blanking plug includes second splines extending in the direction of displacement and configured to cooperate with the first splines provided on the actuating member, the first and second splines being configured to guide the actuating member in translation in the direction of displacement.

19. The percussion apparatus according to claim 18, wherein the drive part includes a threaded drive rod extending substantially parallel to the direction of displacement, and the actuating member includes a tapped axial bore configured to cooperate with the threaded drive rod.

20. The percussion apparatus according to claim 19, wherein the pressure regulating slide, the setting member and the actuating member are disposed substantially coaxially.

* * * * *